United States Patent Office.

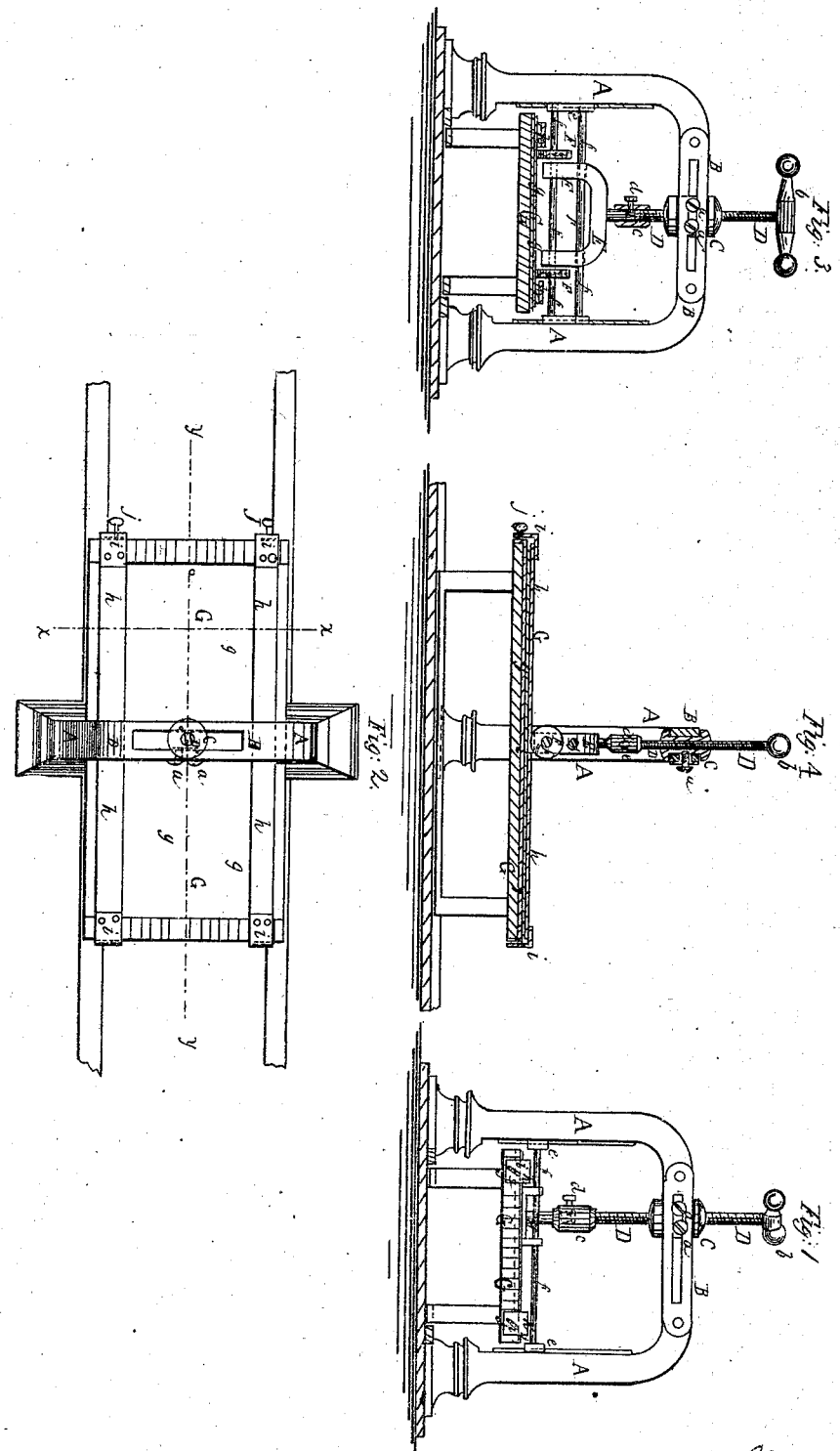

R. K. SLAUGHTER AND J. O. HUNDT, OF NEW YORK, N. Y.

Letters Patent No. 74,159, dated February 4, 1868.

MACHINE FOR EMBOSSING WINDOW-SHADES.

*The Schedule referred to in these Letters Patent and making part of the same.*

TO ALL WHOM IT MAY CONCERN:

Be it known that we, R. K. SLAUGHTER and J. O. HUNDT, of the city, county, and State of New York, have invented a new and improved Machine for Embossing Window-Shades; and we do hereby declare that the following is a full, clear, and exact description thereof, which will enable others skilled in the art to make and use the same, reference being had to the accompanying drawings, forming part of this specification, in which—

Figure 1 represents an end elevation of our invention.

Figure 2 is a plan or top view of the same.

Figure 3 is a vertical transverse section of the same, the plane of section being indicated by the line $y\ y$, fig. 2.

Similar letters of reference indicate corresponding parts.

This invention relates to a new machine for embossing window-shades of all sizes, with ornamental borders and corner or centre-pieces, and consists, first, in the use of a sliding carriage, which is covered with a plate of rubber or other elastic surface, and which is provided with adjustable guide-bars, for guiding the rollers, by which the ornamental borders are produced, and for holding the shade to be embossed on the table.

The invention consists, second, in the arrangement of a press, which is arranged above the carriage, and which is provided with a laterally-adjustable screw, for the purpose of allowing the die, which is secured to the lower end of the screw, to be brought over any one desired corner or side of the shade.

The invention finally consists in the application of up-and-down adjustable guide-bars between the uprights of the press, said bars passing through eyes on the die, so as to allow the latter to be laterally adjusted, if desired, and be moved up and down by the screw, their object being to steady the die.

A A represent the two uprights, and B the upper horizontal bar of a press. C is the nut of the press, said nut being arranged on the bar B so as to be adjustable on the same, it either passing through a slot in the bar, or being otherwise arranged so that it may be moved on the bar. $a\ a$ are set-screws for clamping the nut in any desired position. D is the screw, which passes through the nut C, and which has a handle, B, at its upper end to allow it to be easily turned. To the lower end of the screw D is swivelled a sleeve, $c$, in which a screw or pin, $d$, is arranged.

On the sides of the uprights A A are arranged up-and-down sliding bars or blocks, $e\ e$, which either fit into grooves on the upright, or which are themselves grooved to receive tenons arranged on the uprights. The two opposite sliding blocks $e\ e$ are connected by means of a horizontal bar or bars, $f$, so that they move conjointly.

E is a yoke or frame, having arms or eyes, through which the bars $f$ pass, and having a pin, $g$, on its upper part, which pin may be fitted into the sleeve $c$, and fastened thereto by means of the pin $d$, as shown in figs. 3 and 4.

The screw D being thus connected with the frame E, it is evident that the latter can be moved up and down by the screw, the blocks $e$ following, steadying that motion, and be moved laterally by the setting of the nut C, the bars $f$ steadying such motion.

F F are rollers, secured to one of the bars $f$, or to a horizontal axle that projects from the frame. Their edges are engraved, so that they may impress the desired ornament upon a window-shade. The rollers are, if there are more than one arranged at once on the press, adjustable on their axle, so that they may be set more or less apart, to produce borders on shades of greater or less width.

The shade to be embossed is placed upon a horizontal carriage, G, which is covered with an India-rubber or other elastic bed, $g$, and provided with sliding bars, $h$, as shown. The object of the elastic bed is to avoid the necessity of using a convex and concave die, which is inevitable, unless an elastic bed is provided. The cost of providing double dies and a frame for adjusting the lower dies would be so great that window-shades could not be embossed profitably.

The sliding bars $h$ hold the shade to be embossed upon the carriage, and serve also as guides for the rollers F, which is of greater importance if the rollers are moved by hand instead of being held in the press.

From the ends of the bars $h$ project plates, $i$, which fit over the ends of the carriage, and which may receive a set-screw, $j$, to allow the bars to be clamped in any desired position. The ends of the carriage may be provided with a graduated scale, as shown, so that the bars $h$ may be adjusted with great facility.

For embossing borders, the shade is laid upon the carriage, and is held down by means of the bars $h$, which are adjusted as far apart to admit the rollers between them. The rollers are then brought down upon the shade by means of the screw D, and the carriage is then moved under the rollers by suitable mechanism, suitable stops being provided to arrest the motion of the carriage when the required length of border has been completed.

H represents a flat die for printing centre or corner-pieces. This die is fastened to the screw D in the same manner as the frame E is fastened to the same, and is also guided by the bars $f$, as shown in fig. 1. By means of this die, centre and corner-pieces can be printed with ease, the die being adjustable in the frame A B, so that it can be brought over any desired point of the shade.

Having thus described our invention, what we claim as new, and desire to secure by Letters Patent, is—

1. The carriage G, when provided with an elastic cover, $g$, which acts as a counter-die for embossing window-shades, placed upon the carriage, substantially as and for the purpose herein shown and described.

2. Providing the carriage G with adjustable bars, $h\ h$, which serve to hold the shade smoothly upon the carriage, and to guide the embossing-rollers F F, substantially as herein shown and described.

3. The nut C, when arranged adjustable on the bar B, in which it is held, substantially as set forth, so that the screw D may be moved laterally, as and for the purpose herein shown and described.

4. The frame $e\ f$, when arranged between the uprights of the press, substantially as described, so as to steady the printing-die or roller in every position, and during up-and-down as well as lateral motion of the same, substantially as set forth.

5. The press, consisting of an adjustable screw and die-frame, in combination with the movable carriage G, having an elastic cover, and adjustable guide-bars, $h$, all made and operating substantially as and for the purpose herein shown and described.

R. K. SLAUGHTER,
J. O. HUNDT.

Witnesses:
J. A. SERVICE,
ALEX. F. ROBERTS.